United States Patent
Kottapalli et al.

(10) Patent No.: US 12,081,424 B1
(45) Date of Patent: Sep. 3, 2024

(54) METHODS AND APPARATUS TO DYNAMICALLY MONITOR AND CONTROL COMPUTE DEVICE IDENTITIES DURING OPERATIONS

(71) Applicant: VMware LLC, Palo Alto, CA (US)

(72) Inventors: Ravi Kumar Reddy Kottapalli, Bangaluru (IN); Ravi Ranjan, Bangalore (IN); Sudarshana Kandachar Sridhara Rao, Bengaluru (IN); Venkata Swamy Babu Budumuru, Visakhapatnam (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/298,344

(22) Filed: Apr. 10, 2023

(51) Int. Cl.
*G06F 15/173* (2006.01)
*H04L 41/5003* (2022.01)
*H04L 43/0817* (2022.01)

(52) U.S. Cl.
CPC ...... *H04L 43/0817* (2013.01); *H04L 41/5003* (2013.01)

(58) Field of Classification Search
CPC .................................................. H04L 43/0817
See application file for complete search history.

(56) References Cited

U.S. PATENT DOCUMENTS

| | | | |
|---|---|---|---|
| 2014/0013447 A1* | 1/2014 | Hotti | G06F 21/6209 726/28 |
| 2014/0207861 A1* | 7/2014 | Brandwine | H04L 51/52 709/204 |

* cited by examiner

*Primary Examiner* — Padma Mundur
(74) *Attorney, Agent, or Firm* — Quarles & Brady LLP

(57) ABSTRACT

Methods, apparatus, systems, and articles of manufacture are disclosed to dynamically monitor and control compute device identities during operations. Disclosed is an apparatus comprising interface circuitry, machine readable instructions, and processor circuitry to at least one of instantiate or execute the machine readable instructions to generate a unique label for a node from a data plane, the unique label to identify the node, perform an operation on the node, the operation to be performed on the node by identifying the node associated with the unique label, and maintain the unique label until the operation on the node is successful.

15 Claims, 9 Drawing Sheets

METHODS AND APPARATUS TO DYNAMICALLY MONITOR AND CONTROL COMPUTE DEVICE IDENTITIES DURING OPERATIONS

FIELD OF THE DISCLOSURE

This disclosure relates generally to data centers and, more particularly, to methods and apparatus to dynamically monitor and control compute device identities during operations.

BACKGROUND

In data center management, compute devices (e.g., nodes) are controlled through a data center manager. Node operations are issued via commands from the data center manager and executed on the nodes. Some operations, such as data center upgrades, password management, data center expansions, etc., otherwise known as day two operations, can be applied to multiple nodes across the data center simultaneously.

Figure 1:
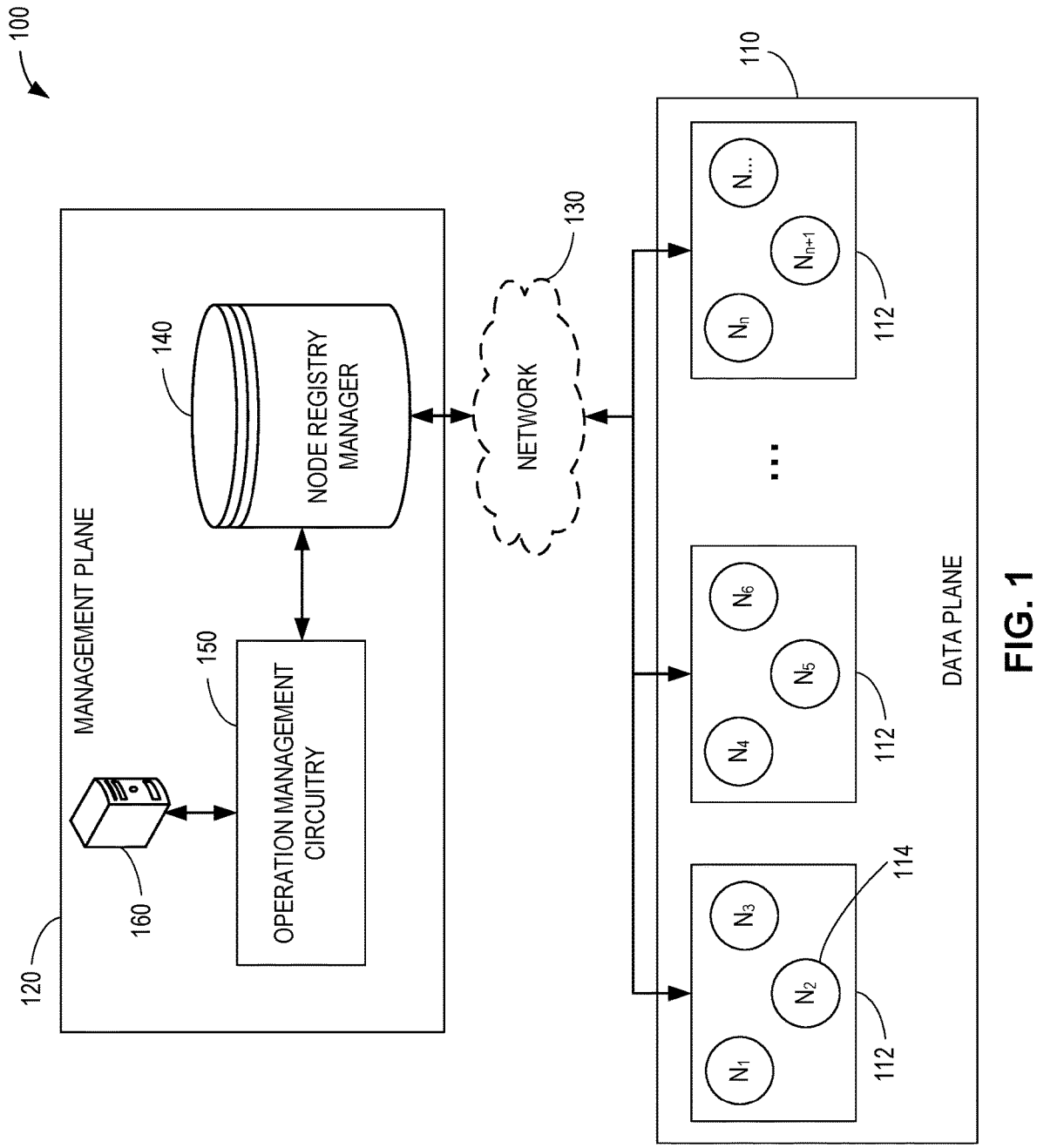
FIG. 1 is a schematic illustration of an example data center operations manager environment.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

In Software Defined Data Centers (SDDC), management operations are handled by a remote server (e.g., a management plane or a data center manager) and include operations such as data center upgrades, password management, data center expansions, etc. These operations are also known as day two operations.

In Scaled SDDC, to manage the data centers including performing day two operations, customers prefer to use loosely coupled (e.g., non-static) compute device (e.g., node) identities. Node identities can include classification information of nodes such as IP addresses. In loosely coupled environments, each node will get a temporary dynamic identity and this identity will be used for node-to-node communications and for day two operations.

When loosely coupled nodes are used for day two operations, the nodes can lose their identity if the node-to-node communication path breaks, and the specific operation can fail. In some cases, if the node regains its identity during the operation, the day two operation will still fail because the communication path was not maintained throughout the operation. In either scenario (e.g., complete loss of communication path or temporary loss of communication path), when the communication path breaks, there is no way to recover the node to ensure the operation was successful and thus requires a restart of the operation.

To work around communication path failures, customers are forced to use statically coupled environments. In some examples, statically coupled environments allow the node identities to stay static. This is not suitable for scaled environments since it is much harder to manage a large number of nodes with static identities and ensure the operations are running smoothly while also eliminating outside interferences (such as hacking or other malicious interferences) and ensuring operations are successful.

Examples disclosed herein identify a solution for maintaining loosely coupled environments during SDDC operations (e.g., day two operations) to ensure the operations execute appropriately and efficiently.

FIG. 1 is a schematic illustration of an example data center operations manager environment 100. The example environment 100 includes a data plane 110, a management plane 120, and a network 130. The data plane 110 and the management plane 120 communicate with each other over the network 130. In some examples, the data plane 110 and the management plane 120 are integrated together and do not require a network 130 to communicate.

The data plane includes a node cluster 112. As illustrated in FIG. 1, the data plane can include more than one node cluster 112. Each node cluster 112 includes at least one node 114 (e.g., $N_1$, $N_2$, ..., $N_n$, etc.). The nodes 114 in the node cluster 112 can be grouped according to geographic location, similarity in functionality, etc. As disclosed herein, a node 114 may also be identified as an endpoint. While the node clusters 112 illustrated herein include three nodes 114 per node cluster 112, any number of nodes 114 can make up a node cluster 112 (e.g., as little as one node 114 and as many nodes 114 as possible).

The management plane 120 includes a node registry manager 140, operation management circuitry 150, and a server 160. In some examples, the node registry manager 140 communicates with the data plane 110 via the network 130.

The node registry manager 140 maintains information on the nodes 114. In some examples, the node registry manager 140 is a database. In some examples, the node registry manager 140 communicates with the nodes 114, the operation management circuitry 150, and/or other devices within the management plane 120 such as the server 160. In some examples, the node registry manager 140 communicates with the nodes 114 via the network 130.

The operation management circuitry 150 controls the execution of the operations on the nodes 114. In some examples, the operation management circuitry 150 communicates with the node registry manager 140 and the server 160 within the management plane 120. In some examples, the operation management circuitry 150 is outside the management plane 120 and the node registry manager 140 and the server 160 are linked with the operation management circuitry 150 via another network similar to the network 130.

The server 160 maintains policy requirements and information regarding the management plane 120. In some examples, a system (e.g., a collection of more than one management planes 120) includes multiple servers 160, and each server 160 can communicate with each other to exchange information about the operation of the system and the successfulness of operations being performed. In some examples, the server 160 communicates with the operation management circuitry 150 within the management plane.

Figure 2:
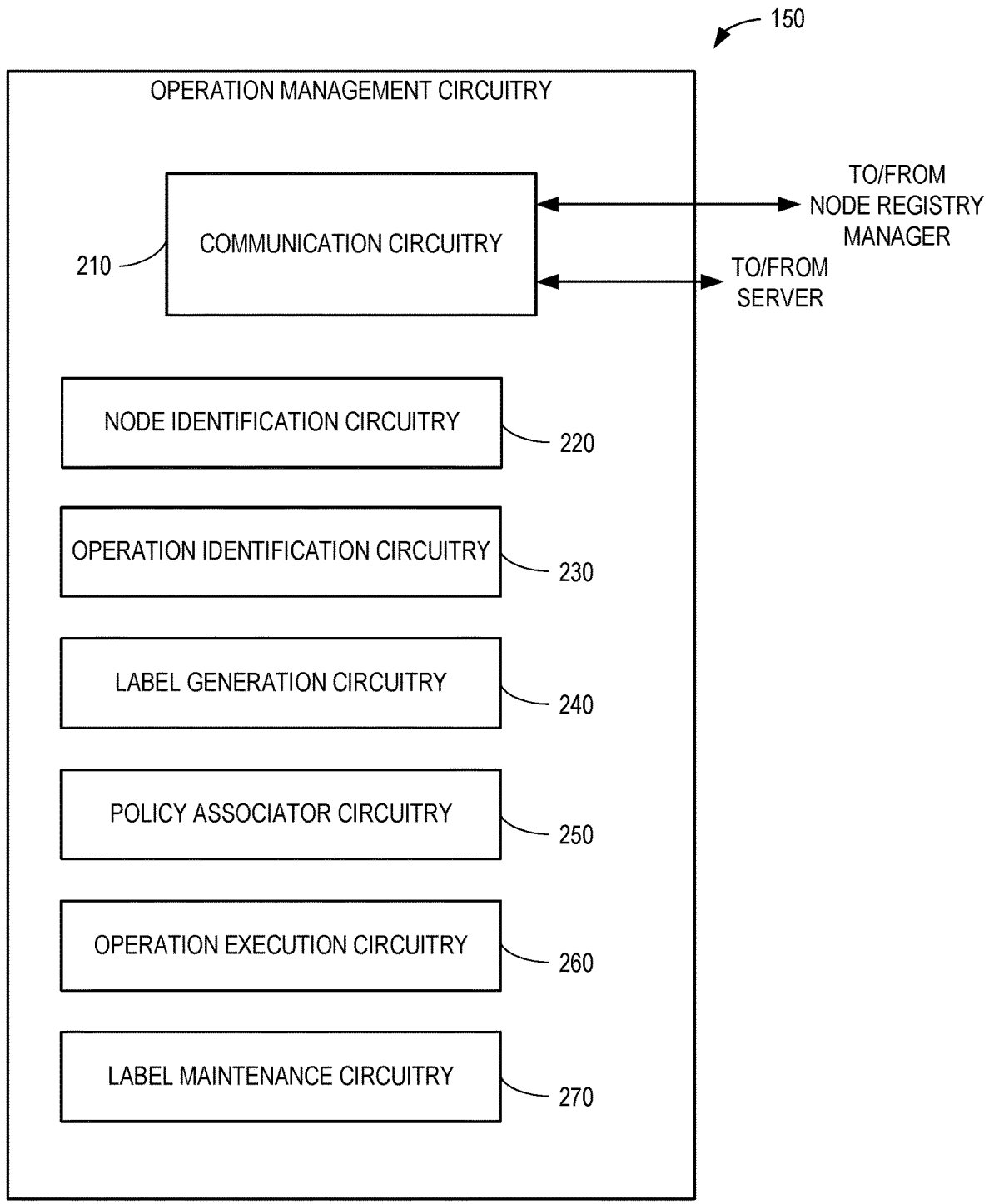
FIG. 2 is a block diagram of an example implementation of the operation management circuitry of FIG. 1.

FIG. 2 is a block diagram of example operation management circuitry 150 to dynamically generate unique node identities and execute operations on the nodes 114. The operation management circuitry 150 of FIG. 2 may be instantiated (e.g., creating an instance of, bring into being for any length of time, materialize, implement, etc.) by processor circuitry such as a central processing unit executing instructions. Additionally or alternatively, the operation management circuitry 150 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

The example operation management circuitry 150 includes communication circuitry 210, node identification circuitry 220, operation identification circuitry 230, label generation circuitry 240, policy associator circuitry 250, operation execution circuitry 260, and label maintenance circuitry 270.

The communication circuitry 210 communicates with the node registry manager 140 and the server 160 to retrieve and send information for executing the operation on the nodes 114. In some examples, the communication circuitry 210 is instantiated by processor circuitry executing communication instructions and/or configured to perform operations such as those represented by the flowchart of FIGS. 3 and 5.

In some examples, the operation management circuitry 150 includes means for communicating. For example, the means for communicating may be implemented by communication circuitry 210. In some examples, the communication circuitry 210 may be instantiated by processor circuitry such as the example processor circuitry 612 of FIG. 6. For instance, the communication circuitry 210 may be instantiated by the example microprocessor 700 of FIG. 7 executing machine executable instructions such as those implemented by at least blocks 310 and 350 of FIG. 3, and 530 of FIG. 5. In some examples, the communication circuitry 210 may be instantiated by hardware logic circuitry, which may be implemented by an ASIC, XPU, or the FPGA circuitry 800 of FIG. 8 structured to perform operations corresponding to the machine readable instructions. Additionally or alternatively, the communication circuitry 210 may be instantiated by any other combination of hardware, software, and/or firmware. For example, the communication circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The node identification circuitry 220 identifies the nodes 114 to execute the operation on. In some examples, the node identification circuitry 220 is instantiated by processor circuitry executing node identification instructions and/or configured to perform operations such as those represented by the flowchart of FIG. 3.

In some examples, the operation management circuitry 150 includes first means for identifying. For example, the first means for identifying may be implemented by node identification circuitry 220. In some examples, the node identification circuitry 220 may be instantiated by processor circuitry such as the example processor circuitry 612 of FIG. 6. For instance, the node identification circuitry 220 may be instantiated by the example microprocessor 700 of FIG. 7 executing machine executable instructions such as those implemented by at least block 320 of FIG. 3. In some examples, the node identification circuitry 220 may be instantiated by hardware logic circuitry, which may be implemented by an ASIC, XPU, or the FPGA circuitry 800 of FIG. 8 structured to perform operations corresponding to the machine readable instructions. Additionally or alternatively, the node identification circuitry 220 may be instantiated by any other combination of hardware, software, and/or firmware. For example, the node identification circuitry 220 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The operation identification circuitry 230 identifies the operations to be executed on the identified nodes 114. In some examples, the operation identification circuitry 230 is instantiated by processor circuitry executing operation identification instructions and/or is configured to perform operations such as those represented by the flowchart of FIG. 3.

In some examples, the operation management circuitry 150 includes second means for identifying. For example, the second means for identifying may be implemented by operation identification circuitry 230. In some examples, the operation identification circuitry 230 may be instantiated by processor circuitry such as the example processor circuitry 612 of FIG. 6. For instance, the operation identification circuitry 230 may be instantiated by the example microprocessor 700 of FIG. 7 executing machine executable instructions such as those implemented by at least block 330 of FIG. 3. In some examples, the operation identification circuitry 230 may be instantiated by hardware logic circuitry, which may be implemented by an ASIC, XPU, or the FPGA circuitry 800 of FIG. 8 structured to perform operations corresponding to the machine readable instructions. Additionally or alternatively, the operation identification circuitry 230 may be instantiated by any other combination of hardware, software, and/or firmware. For example, the operation identification circuitry 230 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The label generation circuitry 240 generates unique labels for each of the identified nodes 114. In some examples, the label generation circuitry 240 is instantiated by processor circuitry executing label generation instructions and/or is configured to perform operations such as those represented by the flowchart of FIG. 4.

In some examples, the operation management circuitry 150 includes means for generating. For example, the means for generating may be implemented by label generation circuitry 240. In some examples, the label generation circuitry 240 may be instantiated by processor circuitry such as the example processor circuitry 612 of FIG. 6. For instance, the label generation circuitry 240 may be instantiated by the example microprocessor 700 of FIG. 7 executing machine executable instructions such as those implemented by at least block 410 of FIG. 4. In some examples, the label generation circuitry 240 may be instantiated by hardware logic circuitry, which may be implemented by an ASIC, XPU, or the FPGA circuitry 800 of FIG. 8 structured to perform operations corresponding to the machine readable instructions. Additionally or alternatively, the label generation circuitry 240 may be instantiated by any other combination of hardware, software, and/or firmware. For example, the label generation circuitry 240 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The policy associator circuitry 250 constructs an association policy for each of the unique labels generated. In some examples, the policy associator circuitry 250 is instantiated by processor circuitry executing policy associator instructions and/or is configured to perform operations such as those represented by the flowchart of FIGS. 4 and 5.

In some examples, the operation management circuitry 150 includes means for constructing. For example, the means for constructing may be implemented by policy associator circuitry 250. In some examples, the policy associator circuitry 250 may be instantiated by processor circuitry such as the example processor circuitry 612 of FIG. 6. For instance, the policy associator circuitry 250 may be instantiated by the example microprocessor 700 of FIG. 7 executing machine executable instructions such as those implemented by at least blocks 420 of FIGS. 4 and 510, 520, 530, and 540 of FIG. 5. In some examples, the policy associator circuitry 250 may be instantiated by hardware logic circuitry, which may be implemented by an ASIC, XPU, or the FPGA circuitry 800 of FIG. 8 structured to perform operations corresponding to the machine readable instructions. Additionally or alternatively, the policy associator circuitry 250 may be instantiated by any other combination of hardware, software, and/or firmware. For example, the policy associator circuitry 250 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The operation execution circuitry 260 executes the operations on the nodes 114. In some examples, the operation execution circuitry 260 is instantiated by processor circuitry executing operation execution instructions and/or is configured to perform operations such as those represented by the flowchart of FIGS. 3 and 4.

In some examples, the operation management circuitry 150 includes means for executing. For example, the means for executing may be implemented by operation execution circuitry 260. In some examples, the operation execution circuitry 260 may be instantiated by processor circuitry such as the example processor circuitry 612 of FIG. 6. For instance, the operation execution circuitry 260 may be instantiated by the example microprocessor 700 of FIG. 7 executing machine executable instructions such as those implemented by at least blocks 340 of FIGS. 3 and 430, 440, and 445 of FIG. 4. In some examples, the operation execution circuitry 260 may be instantiated by hardware logic circuitry, which may be implemented by an ASIC, XPU, or the FPGA circuitry 800 of FIG. 8 structured to perform operations corresponding to the machine readable instructions. Additionally or alternatively, the operation execution circuitry 260 may be instantiated by any other combination of hardware, software, and/or firmware. For example, the operation execution circuitry 260 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The label maintenance circuitry 270 maintains the unique labels on the nodes 114. In some examples, the label maintenance circuitry 270 is instantiated by processor circuitry executing label maintenance instructions and/or is configured to perform operations such as those represented by the flowchart of FIG. 4.

In some examples, the operation management circuitry 150 includes means for maintaining. For example, the means for maintaining may be implemented by label maintenance circuitry 270. In some examples, the label maintenance circuitry 270 may be instantiated by processor circuitry such as the example processor circuitry 612 of FIG. 6. For instance, the label maintenance circuitry 270 may be instantiated by the example microprocessor 700 of FIG. 7 executing machine executable instructions such as those implemented by at least blocks 450 and 460 of FIG. 4. In some examples, the label maintenance circuitry 270 may be instantiated by hardware logic circuitry, which may be implemented by an ASIC, XPU, or the FPGA circuitry 800 of FIG. 8 structured to perform operations corresponding to the machine readable instructions. Additionally or alternatively, the label maintenance circuitry 270 may be instantiated by any other combination of hardware, software, and/or firmware. For example, the label maintenance circuitry 270 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for maintaining includes means for releasing the unique labels from the nodes 14 upon a successful completion of the operation. In some examples, the means for releasing is implemented by label maintenance circuitry 270.

While an example manner of implementing the operation management circuitry 150 of FIG. 1 is illustrated in FIG. 2, one or more of the elements, processes, and/or devices illustrated in FIG. 2 may be combined, divided, re-arranged, omitted, eliminated, and/or implemented in any other way. Further, the example communication circuitry 210, node identification circuitry 220, operation identification circuitry 230, label generation circuitry 240, policy associator circuitry 250, operation execution circuitry 260, label maintenance circuitry 270, and/or, more generally, the example operation management circuitry 150 of FIG. 1, may be implemented by hardware alone or by hardware in combination with software and/or firmware. Thus, for example, any of the example communication circuitry 210, node identification circuitry 220, operation identification circuitry 230, label generation circuitry 240, policy associator circuitry 250, operation execution circuitry 260, label maintenance circuitry 270, and/or, more generally, the example operation management circuitry 150, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example operation management circuitry 150 of FIG. 1 may include one or more elements, processes, and/or devices in addition to, or instead of, those illustrated in FIG. 2, and/or may include more than one of any or all of the illustrated elements, processes and devices.

Figure 3:
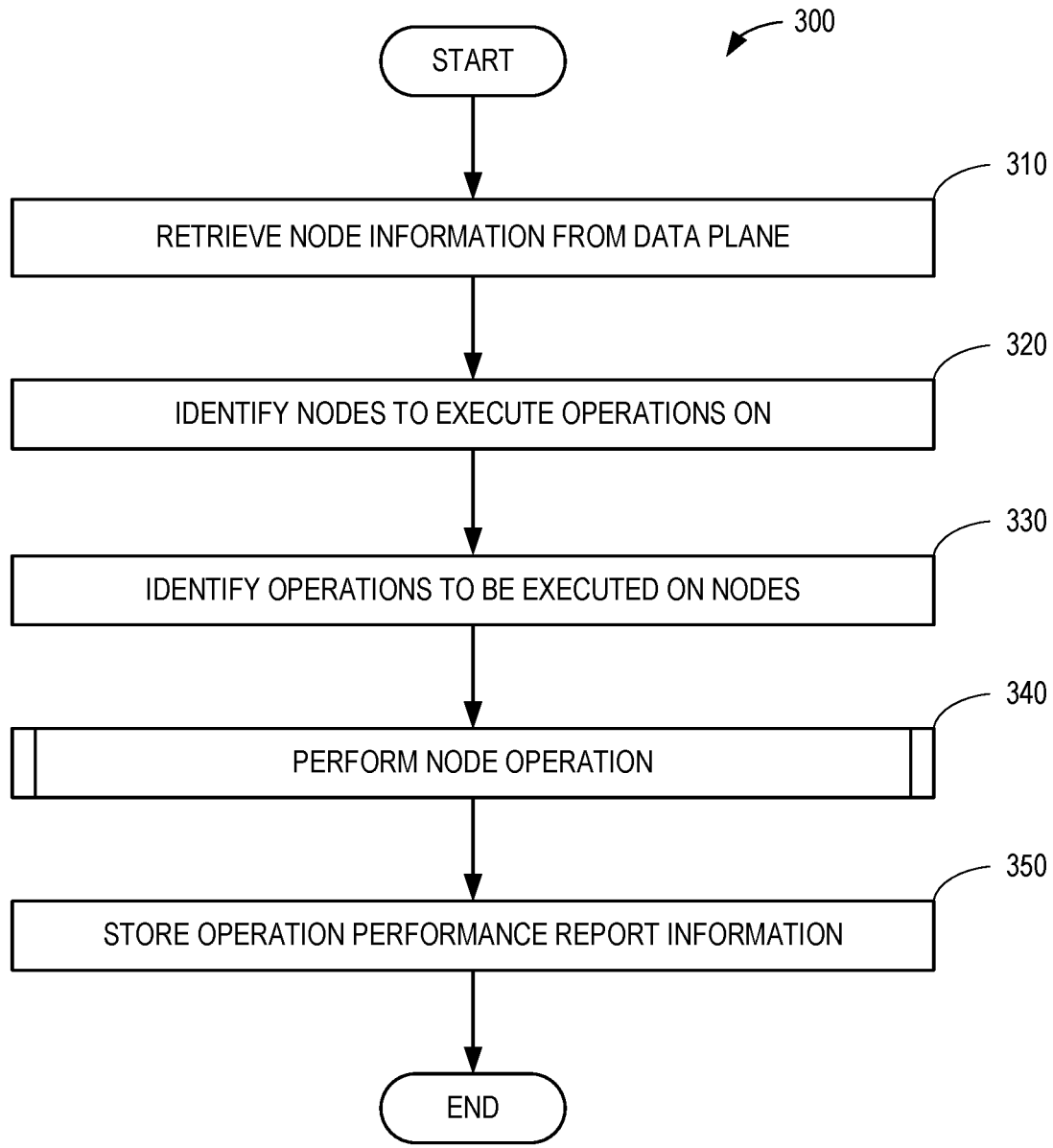
FIG. 3 is a flowchart representative of example machine readable instructions and/or example operations that may be executed by example processor circuitry to implement the operation management circuitry of FIG. 2.
Figure 4:
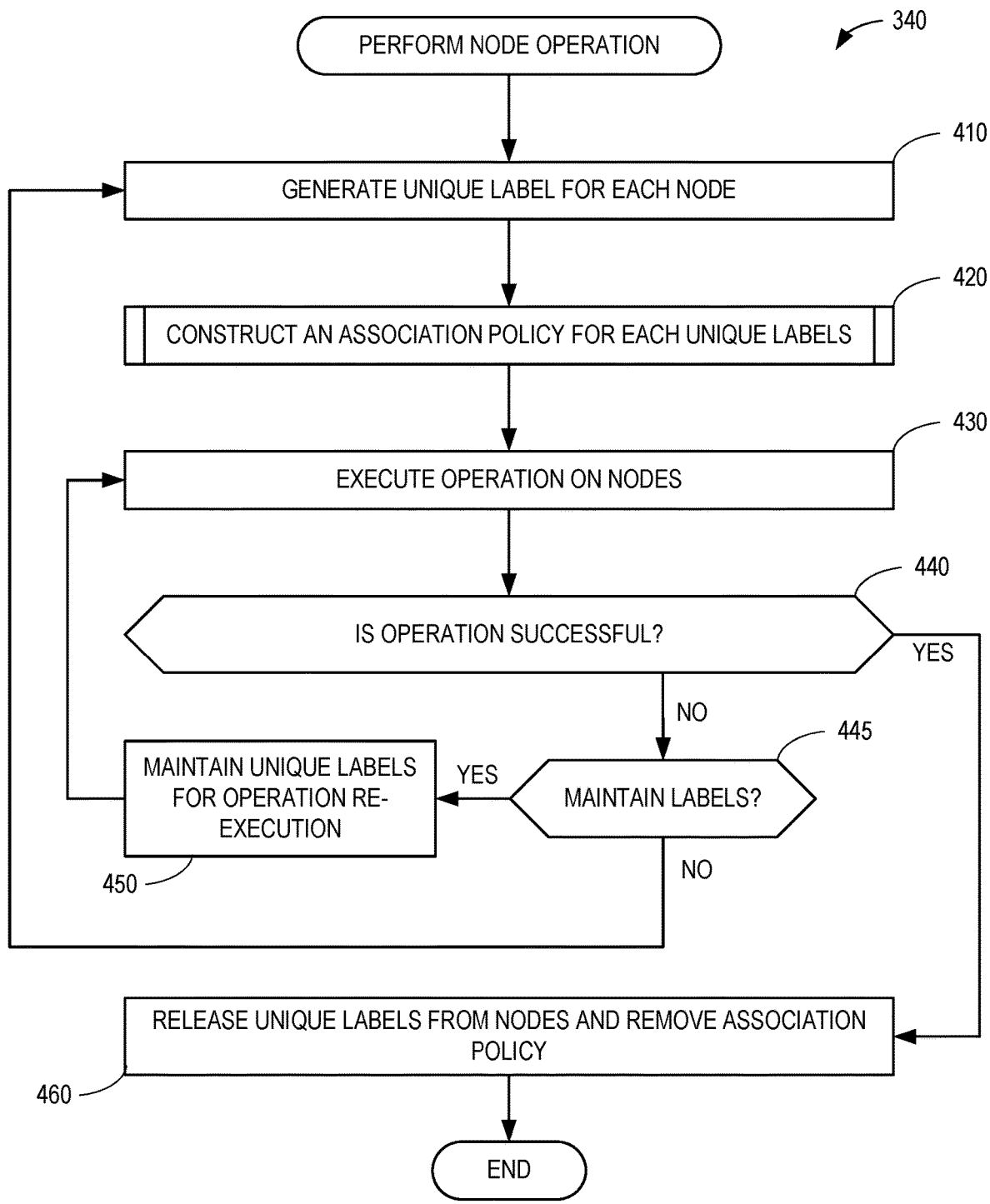
FIG. 4 is a flowchart representative of example machine readable instructions and/or example operations that may be executed by example processor circuitry to perform an operation on a node of FIG. 1.
Figure 5:
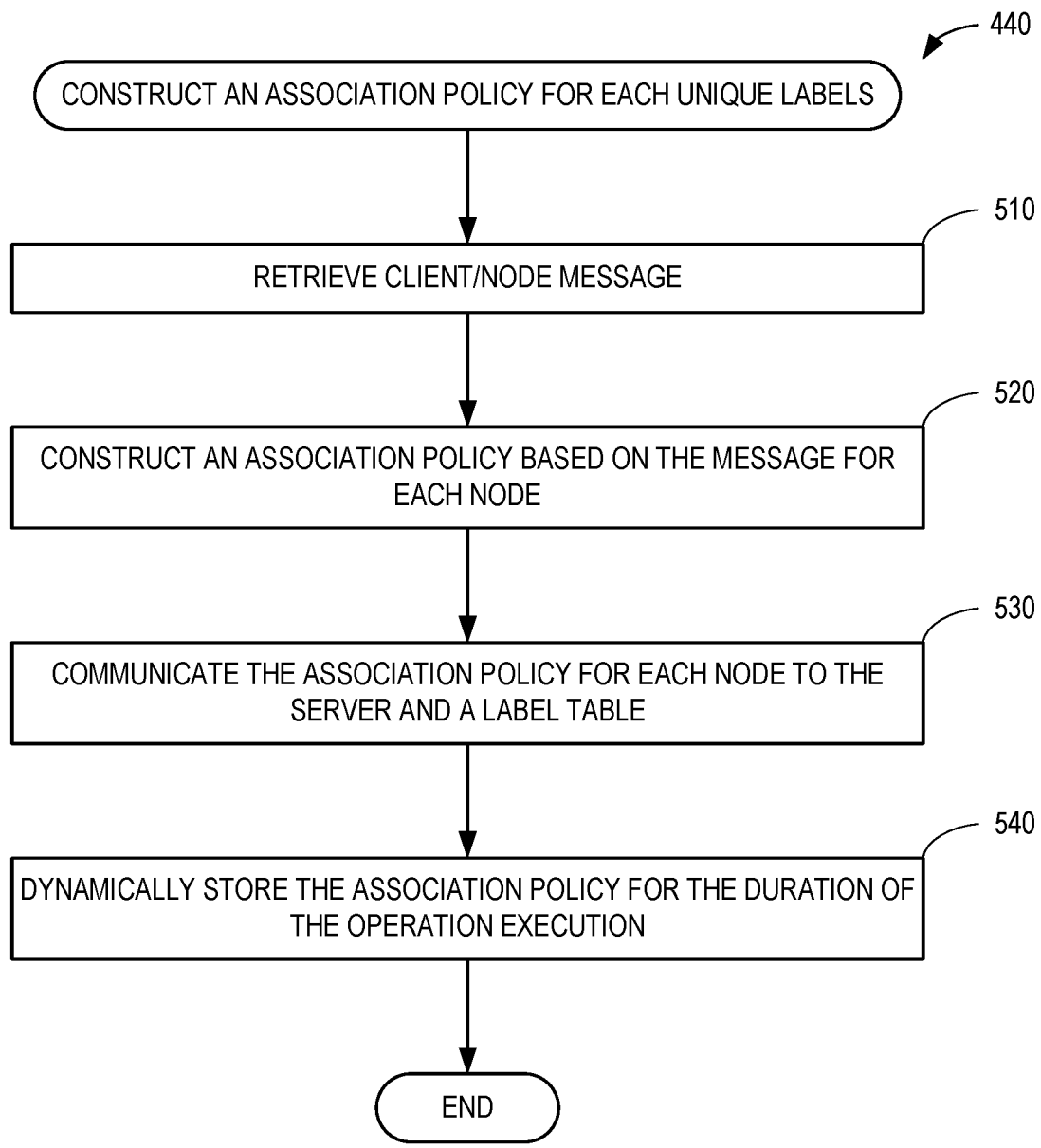
FIG. 5 is a flowchart representative of example machine readable instructions and/or example operations that may be executed by example processor circuitry to implement example policy associator circuitry of FIG. 2.

Flowcharts representative of example machine readable instructions, which may be executed to configure processor circuitry to implement the operation management circuitry 150 of FIG. 2, is shown in FIGS. 3, 4, and 5. The machine readable instructions may be one or more executable programs or portion(s) of an executable program for execution by processor circuitry, such as the processor circuitry 612 shown in the example processor platform 600 discussed below in connection with FIG. 6 and/or the example processor circuitry discussed below in connection with FIGS. 7 and/or 8. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 3, 4, and 5, many other methods of implementing the example operation management circuitry 150 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3, 4, and 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or example operations 300 that may be executed and/or instantiated by processor circuitry to implement the operation management circuitry 150 of FIG. 2. The example operation management process 300 of FIG. 3 begin at block 310, at which the communication circuitry 210 retrieves information on the node(s) 114 from the data plane 110. In some examples, the communication circuitry 210 retrieves information on the nodes 114 directly from the node registry manager 140. In some examples, the communication circuitry 210 instructs the node registry manager 140 to retrieve information on the nodes 114 from the data plane 110 before the communication circuitry 210 retrieves the information from the node registry manager 140. In some examples, the information retrieved may include current node identities (e.g., a classification, organization, grouping, etc.). In some examples, the information retrieved may include node location within the environment 100 (e.g., physical geographical location).

Once the information on the nodes 114 is retrieved by the communication circuitry 210, the node identification circuitry 220 then identifies which nodes 114 the operation is to be executed on. (Block 320). In some examples, the list of nodes 114 retrieved from the node registry manager 140 includes nodes 114 that do not need to be updated/managed. In such an example, the node identification circuitry 220 narrows down the list of nodes 114 to be updated/managed. Such a narrowing could include identifying nodes 114 that have already been updated, nodes 114 that do not pose a security risk to the environment 100, dynamically identifying workloads on the nodes 114, etc.

Once the nodes 114 have been identified by the node identification circuitry 220, the operation identification circuitry 230 then identifies the operations to be performed on the nodes 114. (Block 330). In some examples, the same operation (e.g., data center upgrade, password management, etc.) is to be performed on each node 114. In other examples, a different operation is to be performed on each node 114. Further, in some examples, the nodes 114 are grouped through some means (e.g., similar geographic location, similar functionality, etc.) and an independent operation is to be performed on each node 114.

When the operations have been identified by the operation identification circuitry 230, the operation management circuitry 150 then performs the operations on the nodes 114. (Block 340). In some examples, the operations are performed more than once (e.g., once for each node 114). In some examples, the operations are performed in parallel or in series.

Once the operations have been performed by the operation management circuitry 150, the communication circuitry 210 stores the performance results (e.g., success or failure) of the operations. (Block 350). In some examples, the results are stored in the server 160. In some examples, the results are stored in the node registry manager 140. Once the operations have completed and the results are stored, the example operation management process 300 ends.

FIG. 4 is a flowchart representative of example machine readable instructions and/or example operations 400 that may be executed and/or instantiated by processor circuitry to perform the operation(s) on the node(s) 114. The example node operation execution process 400 of FIG. 4 begin at block 410, at which the label generation circuitry 240 generates a unique label for each node 114 identified for the operation. In some examples, the unique label is a dynamic tag (e.g., memory address, IP address, etc.) for associating the respective node 114 with the operation being performed. As mentioned above, in loosely coupled environments, node identities are susceptible to corruption/failure in an event where node-to-node communication is lost. Generating these unique labels solves this problem by dynamically associating the nodes 114 with a more robust identifier. In some examples, the unique labels are stored in a label table housed on the server 160 which can be accessed by the communication circuitry 210 and/or the node registry manager 140. In some examples, the label table is housed on the operation management circuitry 150.

Once the unique labels are generated for each node 114 in the operation by the label generation circuitry 240, the policy associator circuitry 250 constructs an association policy for each unique label. (Block 420). In some examples, the association policy includes system-wide (e.g., across the entire environment 100) safety policies to ensure the operations are executed without outside interference (e.g., hacking/malicious intervention). In some examples, each node 114 and/or each operation being executed can require a different association policy, and thus multiple association policies can be constructed and assigned. In some examples, a single association policy is applied across all unique labels.

Once the association policy is constructed by the policy associator circuitry 240, the operation execution circuitry 260 executes the operations on the node(s) 114. (Block 430). In some examples, as disclosed above, operations are performed in parallel or in series and can be repeated if necessary.

During execution of the operation by the operation execution circuitry 260, the operation execution circuitry 260 monitors the execution of the operation to identify an execution state of the operation. The operation execution circuitry 260 determines whether the operation being executed is successful. (Block 440). In some examples, the execution state includes any one or more of in-progress, failed, succeeded, hung, etc.

When the operation execution circuitry 260 determines that the operation was not successful (e.g., block 440 returns a result of NO), the operation execution circuitry 260 determines whether to maintain the unique labels on the nodes 114. (Block 445).

When the operation execution circuitry 260 determines that the unique labels are to be re-generated (e.g., block 445 returns a result of NO), the label generation circuitry 230 generates new unique labels for each node 114 (e.g., return to block 410). The example node operation execution process 400 then repeats blocks 410-440.

When the operation execution circuitry 260 determines that the unique labels are to be maintained on the nodes 114 (e.g., block 445 returns a result of YES), the label maintenance circuitry 270 maintains the unique labels for re-execution of the operation (Block 450). The operation execution circuitry 260 then re-executes the operation (e.g., return to block 430). In some examples, the unique labels are maintained until the operation results in a successful execution state. The example node operation execution process 400 then determines whether the operation was successful with every re-execution of the operation (e.g., block 440 re-executes).

When the operation execution circuitry 260 determines that the operation was successful (e.g., block 440 returns a result of YES), the label maintenance circuitry 270 then releases the unique labels from the nodes 114 and removes the association policy assigned to the nodes 114. (Block 460). In some examples, the unique labels and the association policies are stored in the server 160 and/or the node registry manager 140 after the completion of the operation. In such an example, the server 160 and/or the node registry manager 140 maintains a log of the previous operation executions. In some examples, the unique labels and the association policy is not stored and just the result of the operation execution is stored (e.g., block 350 of FIG. 3). Once the unique labels and association policies are removed/released, the example node operation execution process 400 ends.

FIG. 5 is a flowchart representative of example machine readable instructions and/or example operations 500 that may be executed and/or instantiated by processor circuitry to construct an association policy for each unique label generated by the label generation circuitry 240. The example policy association process 500 of FIG. 5 begin at block 510, at which the policy associator circuitry 250 retrieves a node message from the nodes 114. In some examples, the node message is stored on the node registry manager 140 and accessed by the policy associator circuitry 250 via the communication circuitry 210 accessing information on the node registry manager 140.

Once the node message is retrieved by the policy associator circuitry 250, the policy associator circuitry 250 constructs an association policy for each node based on the information in the node message. (Block 520). In some examples, the node message includes information about a status of the node (e.g., whether node is online, node health, etc.). In some examples, the node message includes information about policy requirements (e.g., node initiated security measures, update timelines/thresholds, etc.).

Once the association policy is constructed by the policy associator circuitry 250, the communication circuitry 210 then communicates the association policy to the server 160. (Block 530). In some examples, the server 160 maintains a record of the association policies constructed and stores them with the unique labels (e.g., the label table) generated by the label generation circuitry 250.

Once the association policy is communicated with the server 160 by the communication circuitry 210, the policy associator circuitry 250 dynamically (e.g., non-static) stores the association policy for the duration of the execution of the operation on the nodes 114. (Block 540). In some examples, the association policy is stored in volatile memory which is then deleted/removed upon completion of the operation (e.g., block 460 of FIG. 4). In other examples, the association policy is stored on the server 160 and/or the node registry manager 140 in non-volatile memory. Once the association policy is stored, the example policy association process 500 ends.

Figure 6:
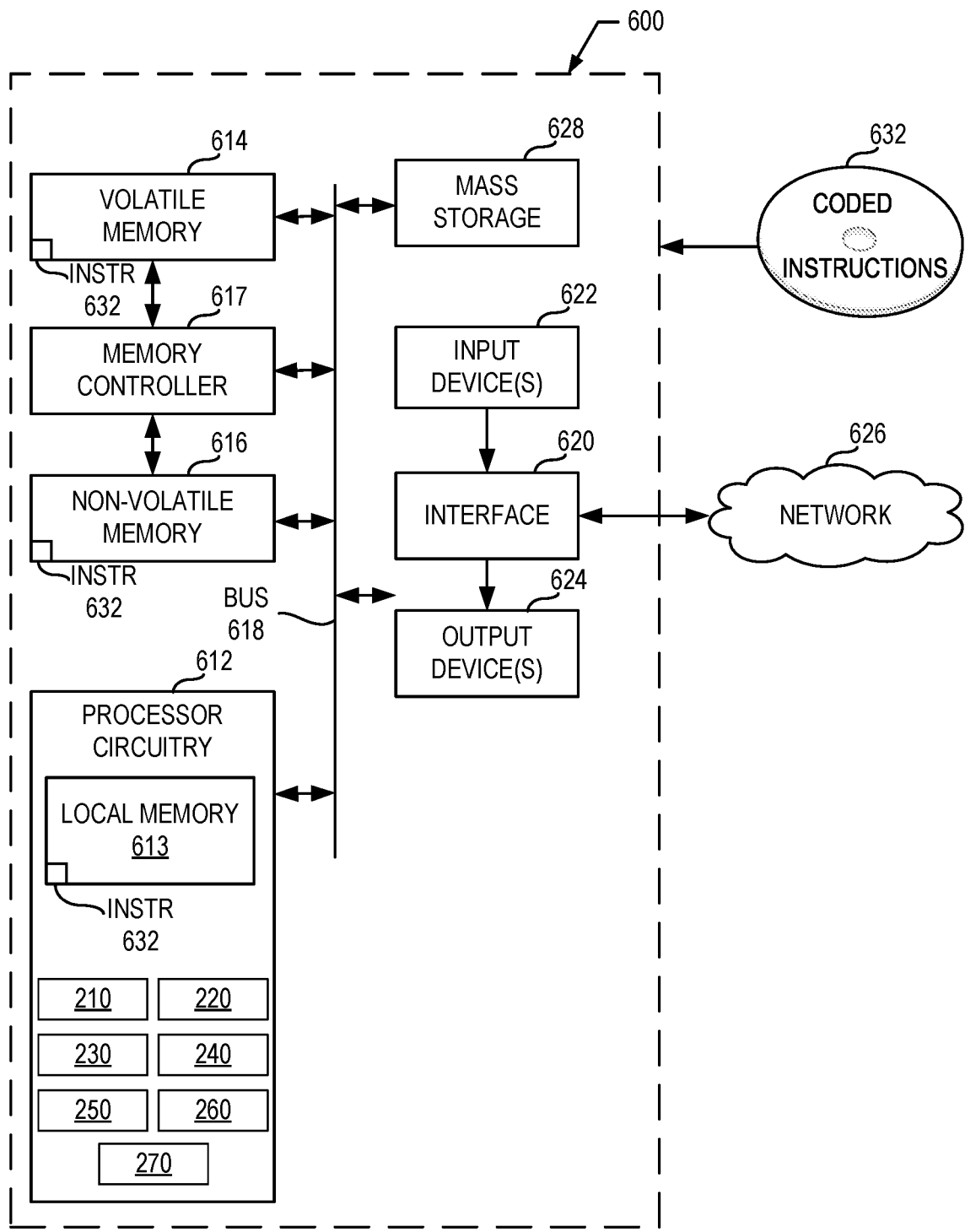
FIG. 6 is a block diagram of an example processing platform including processor circuitry structured to execute example machine to implement the operation management circuitry of FIG. 2.

FIG. 6 is a block diagram of an example processor platform 600 structured to execute and/or instantiate the machine readable instructions and/or the operations of FIGS. 3, 4, and 5 to implement the example data center operations manager environment 100 of FIG. 1. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), a gaming console, a personal video recorder, a set top box, a headset (e.g., an augmented reality (AR) headset, a virtual reality (VR) headset, etc.) or other wearable device, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs, microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements the communication circuitry 210, node identification circuitry 220, operation identification circuitry 230, label generation circuitry 240, policy associator circuitry 250, operation execution circuitry 260, and label maintenance circuitry 270.

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user to enter data and/or commands into the processor circuitry 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS)

display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 632, which may be implemented by the machine readable instructions of FIGS. 3, 4, and 5, may be stored in the mass storage device 628, in the volatile memory 614, in the non-volatile memory 616, and/or on a removable non-transitory computer readable storage medium such as a CD or DVD.

Figure 7:
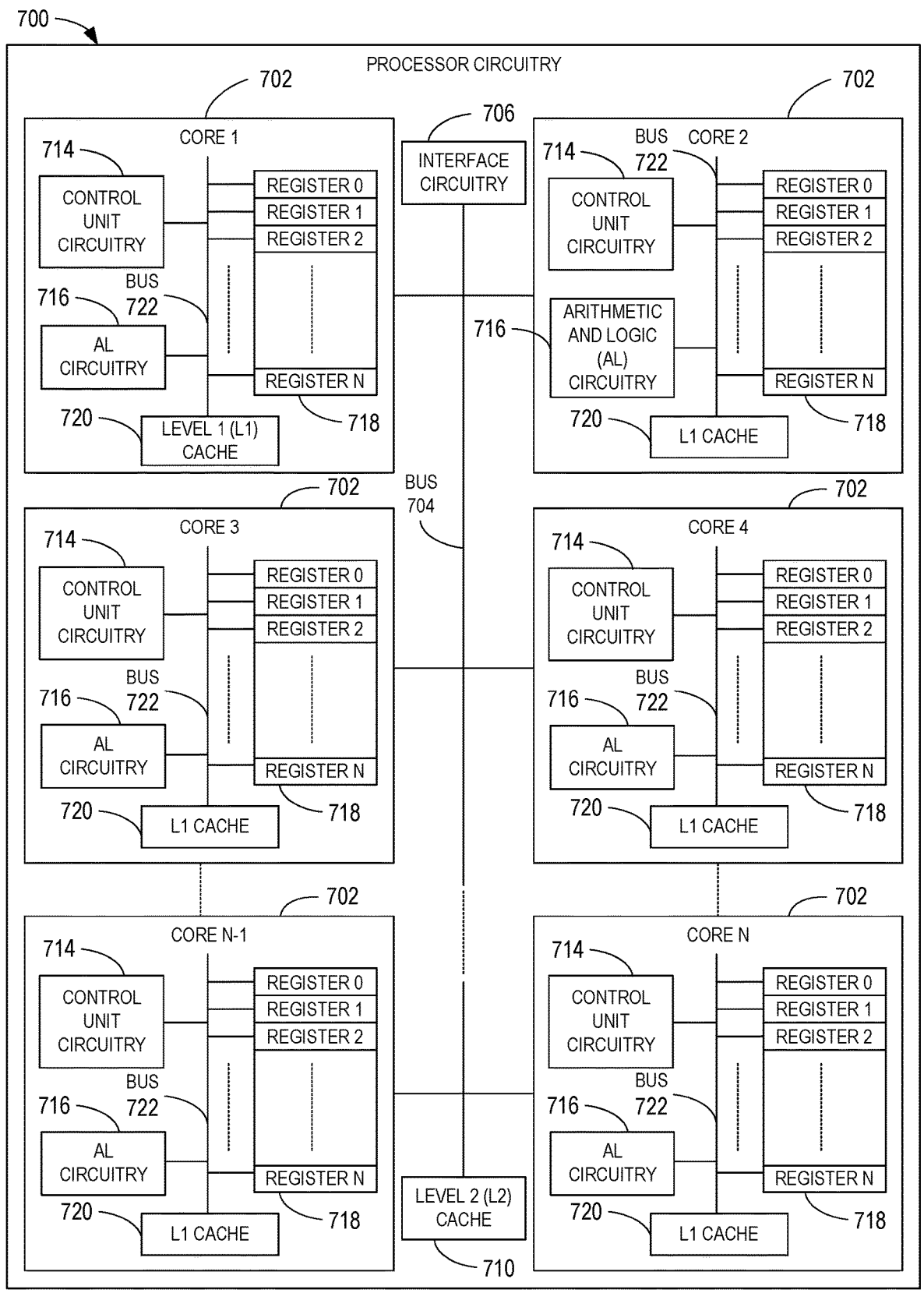
FIG. 7 is a block diagram of an example implementation of the processor circuitry of FIG. 6.

FIG. 7 is a block diagram of an example implementation of the processor circuitry 612 of FIG. 6. In this example, the processor circuitry 612 of FIG. 6 is implemented by a microprocessor 700. For example, the microprocessor 700 may be a general purpose microprocessor (e.g., general purpose microprocessor circuitry). The microprocessor 700 executes some or all of the machine readable instructions of the flowcharts of FIGS. 3, 4, and 5 to effectively instantiate the operation management circuitry 150 of FIG. 2 as logic circuits to perform the operations corresponding to those machine readable instructions. In some such examples, the operation management circuitry 150 of FIG. 2 is instantiated by the hardware circuits of the microprocessor 700 in combination with the instructions. For example, the microprocessor 700 may be implemented by multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowcharts of FIGS. 3, 4, and 5.

The cores 702 may communicate by a first example bus 704. In some examples, the first bus 704 may be implemented by a communication bus to effectuate communication associated with one(s) of the cores 702. For example, the first bus 704 may be implemented by at least one of an Inter-Integrated Circuit (I2C) bus, a Serial Peripheral Interface (SPI) bus, a PCI bus, or a PCIe bus. Additionally or alternatively, the first bus 704 may be implemented by any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2 cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the local memory 720, and a second example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating point operations. In yet other examples, the AL circuitry 716 may include first AL circuitry that performs integer based operations and second AL circuitry that performs floating point operations. In some examples, the AL circuitry 716 may be referred to as an Arithmetic Logic Unit (ALU). The registers 718 are semiconductor-based structures to store data and/or instructions such as results of one or more of the operations performed by the AL circuitry 716 of the corresponding core 702. For example, the registers 718 may include vector register(s), SIMD register(s), general purpose register(s), flag register(s), segment register(s), machine specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure including distributed throughout the core 702 to shorten access time. The second bus 722 may be implemented by at least one of an I2C bus, a SPI bus, a PCI bus, or a PCIe bus Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 8:
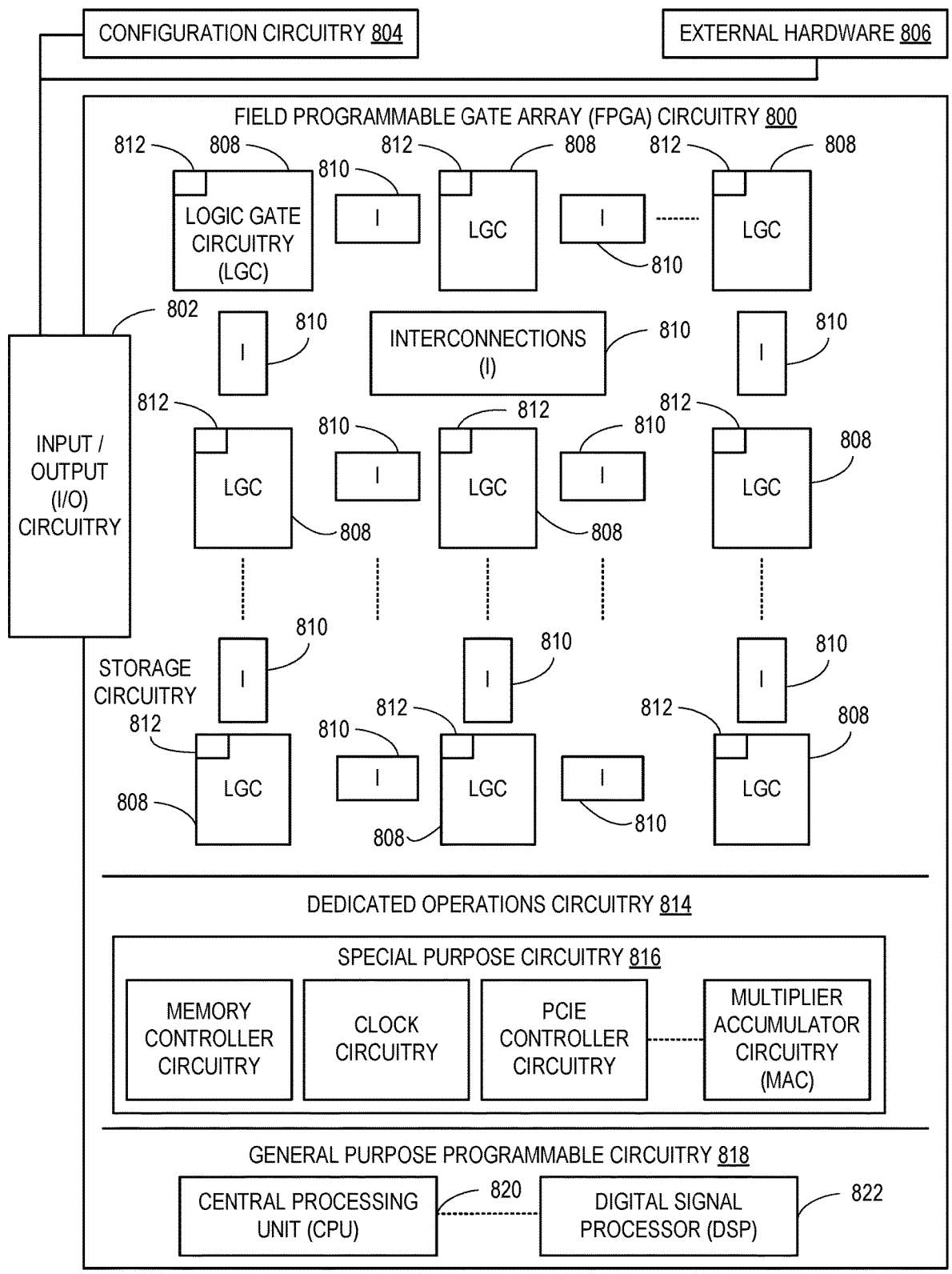
FIG. 8 is a block diagram of another example implementation of the processor circuitry of FIG. 6.

FIG. 8 is a block diagram of another example implementation of the processor circuitry 612 of FIG. 6. In this example, the processor circuitry 612 is implemented by FPGA circuitry 800. For example, the FPGA circuitry 800 may be implemented by an FPGA. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the machine readable instructions in hardware and, thus, can often execute the operations faster than they could be performed by a general purpose microprocessor executing the corresponding software.

More specifically, in contrast to the microprocessor 700 of FIG. 7 described above (which is a general purpose device that may be programmed to execute some or all of the machine readable instructions represented by the flowcharts of FIGS. 3, 4, and 5 but whose interconnections and logic circuitry are fixed once fabricated), the FPGA circuitry 800 of the example of FIG. 8 includes interconnections and logic circuitry that may be configured and/or interconnected in different ways after fabrication to instantiate, for example, some or all of the machine readable instructions represented by the flowcharts of FIGS. 3, 4, and 5. In particular, the FPGA circuitry 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the software represented by the flowcharts of FIGS. 3, 4, and 5. As such, the FPGA circuitry 800 may be structured to effectively instantiate some or all of the machine readable instructions of the flowcharts of FIGS. 3, 4, and 5 as dedicated logic circuits to perform the operations corresponding to those software instructions in a dedicated manner analogous to an ASIC. Therefore, the FPGA circuitry 800 may perform the operations corresponding to the some or all of the machine readable instructions of FIGS. 3, 4, and 5 faster than the general purpose microprocessor can execute the same.

In the example of FIG. 8, the FPGA circuitry 800 is structured to be programmed (and/or reprogrammed one or more times) by an end user by a hardware description language (HDL) such as Verilog. The FPGA circuitry 800 of FIG. 8, includes example input/output (I/O) circuitry 802 to obtain and/or output data to/from example configuration circuitry 804 and/or external hardware 806. For example, the configuration circuitry 804 may be implemented by interface circuitry that may obtain machine readable instructions to configure the FPGA circuitry 800, or portion(s) thereof. In some such examples, the configuration circuitry 804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 806 may be implemented by external hardware circuitry. For example, the external hardware 806 may be implemented by the microprocessor 700 of FIG. 7. The FPGA circuitry 800 also includes an array of example logic gate circuitry 808, a plurality of example configurable interconnections 810, and example storage circuitry 812. The logic gate circuitry 808 and the configurable interconnections 810 are configurable to instantiate one or more operations that may correspond to at least some of the machine readable instructions of FIGS. 3, 4, and 5 and/or other desired operations. The logic gate circuitry 808 shown in FIG. 8 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations. The logic gate circuitry 808 may include other electrical structures such as look-up tables (LUTs), registers (e.g., flip-flops or latches), multiplexers, etc.

The configurable interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example Dedicated Operations Circuitry 814. In this example, the Dedicated Operations Circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the processor circuitry 612 of FIG. 6, many other approaches are contemplated. For example, as mentioned above, modern FPGA circuitry may include an onboard CPU, such as one or more of the example CPU 820 of FIG. 8. Therefore, the processor circuitry 612 of FIG. 6 may additionally be implemented by combining the example microprocessor 700 of FIG. 7 and the example FPGA circuitry 800 of FIG. 8. In some such hybrid examples, a first portion of the machine readable instructions represented by the flowcharts of FIGS. 3, 4, and 5 may be executed by one or more of the cores 702 of FIG. 7, a second portion of the machine readable instructions represented by the flowcharts of FIGS. 3, 4, and 5 may be executed by the FPGA circuitry 800 of FIG. 8, and/or a third portion of the machine readable instructions represented by the flowcharts of FIGS. 3, 4, and 5 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 612 of FIG. 6 may be in one or more packages. For example, the microprocessor 700 of FIG. 7 and/or the FPGA circuitry 800 of FIG. 8 may be in one or more packages. In some examples, an XPU may be implemented by the processor circuitry 612 of FIG. 6, which may be in one or more packages. For example, the XPU may include a CPU in one package, a DSP in another package, a GPU in yet another package, and an FPGA in still yet another package.

Figure 9:
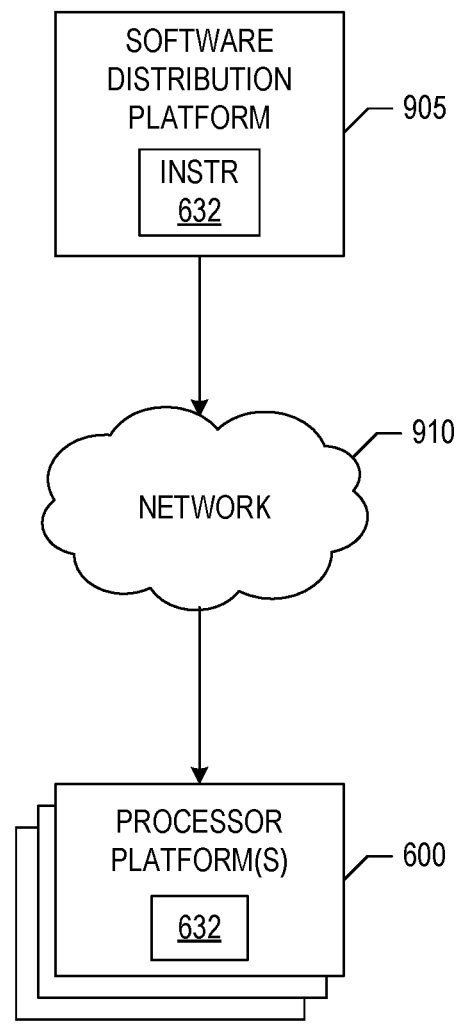
FIG. 9 is a block diagram of an example software distribution platform (e.g., one or more servers) to distribute software (e.g., software corresponding to the example machine readable instructions of FIGS. 3-5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 905 to distribute software such as the example machine readable instructions 632 of FIG. 6 to hardware devices owned and/or operated by third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform 905. For example, the entity that owns and/or operates the software distribution platform 905 may be a developer, a seller, and/or a licensor of software such as the example machine readable instructions 632 of FIG. 9. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the machine readable instructions 632, which may correspond to the example machine readable instructions of FIGS. 3, 4, and 5, as described above. The one or more servers of the example software distribution platform 905 are in communication with an example network 910, which may correspond to any one or more of the Internet and/or any of the example networks 632 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 632 from the software distribution platform 905. For example, the software, which may correspond to the example machine readable instructions of FIGS. 3, 4, and 5, may be downloaded to the example processor platform 600, which is to execute the machine readable instructions 632 to implement the operation management circuitry 150. In some examples, one or more servers of the software distribution platform 905 periodically offer, transmit, and/or force updates to the software (e.g., the example machine readable instructions 632 of FIG. 6) to ensure improvements, patches, updates, etc., are distributed and applied to the software at the end user devices.

From the foregoing, it will be appreciated that example systems, methods, apparatus, and articles of manufacture have been disclosed that dynamically monitor and control compute device identities during operations. Disclosed systems, methods, apparatus, and articles of manufacture improve the efficiency of using a computing device by generating unique labels associated with nodes in which operations are to be executed upon and maintaining those unique labels throughout the duration of the operation execution. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to dynamically monitor and control compute device identities during operations are disclosed herein. Further examples and combinations thereof include the following:

Example 1 includes an apparatus comprising interface circuitry, machine readable instructions, and processor circuitry to at least one of instantiate or execute the machine readable instructions to generate a unique label for a node from a data plane, the unique label to identify the node, perform an operation on the node, the operation to be performed on the node by identifying the node associated with the unique label, and maintain the unique label until the operation on the node is successful.

Example 2 includes the apparatus of example 1, further including retrieving a message from the data plane, the message indicating a status of the node.

Example 3 includes the apparatus of example 2, wherein the processor circuitry is to construct an association policy for the unique label.

Example 4 includes the apparatus of example 3, wherein the association policy is communicated to a server, the server to maintain the association policy.

Example 5 includes the apparatus of example 3, wherein the processor circuitry is to release the unique label and the association policy from the nodes upon successful completion of the operation.

Example 6 includes the apparatus of example 1, wherein the processor circuitry is to re-execute the operation after an unsuccessful completion of the operation.

Example 7 includes the apparatus of example 1, wherein the processor circuitry is to retrieve information from more than one node, the processor circuitry to generate a respective unique label for each node.

Example 8 includes the apparatus of example 7, wherein the processor circuitry is to identify a respective operation for each node and perform the respective operation on each node, each respective operation to be performed on each node by identifying the node using the respective unique label.

Example 9 includes the apparatus of example 1, wherein the operation is a day two operation.

Example 10 includes a non-transitory machine readable storage medium comprising instructions that, when executed, cause processor circuitry to at least generate a unique label for a node from a data plane, the unique label to identify the node from an environment of nodes, perform an operation on the node, the operation to be performed on the node by identifying the node associated with the unique label, and maintain the unique label until the operation on the node is successful.

Example 11 includes the non-transitory machine readable storage medium of example 10, wherein the instructions, when executed, cause the processor circuitry to retrieve a message from the data plane, the message indicating a status of the node.

Example 12 includes the non-transitory machine readable storage medium of example 11, wherein the instructions, when executed, cause the processor circuitry to construct an association policy for the unique label.

Example 13 includes the non-transitory machine readable storage medium of example 12, wherein the association policy is communicated to a server, the server to maintain the association policy.

Example 14 includes the non-transitory machine readable storage medium of example 12, wherein the instructions, when executed, cause the processor circuitry to release the unique label and the association policy from the nodes upon successful completion of the operation.

Example 15 includes the non-transitory machine readable storage medium of example 10, wherein the instructions, when executed, cause the processor circuitry to re-execute the operation after an unsuccessful completion of the operation.

Example 16 includes the non-transitory machine readable storage medium of example 10, wherein the instructions, when executed, cause the processor circuitry to retrieve information from more than one node, the processor circuitry to generate a respective unique label for each node.

Example 17 includes the non-transitory machine readable storage medium of example 16, wherein the instructions, when executed, cause the processor circuitry to identify a respective operation for each node and perform the respective operation on each node, each respective operation to be performed on each node by identifying the node using the respective unique label.

Example 18 includes the non-transitory machine readable storage medium of example 10, wherein the operation is a day two operation.

Example 19 includes an apparatus comprising means for communicating with a plurality of nodes and a server, the means for communicating to collect information regarding the plurality of nodes from a data plane, first means for identifying, from the plurality of nodes, a set of nodes to execute an operation on, second means for identifying a respective operation to be performed on each of the set of nodes, means for generating a respective unique label for each of the set of nodes, each respective unique label to identify each individual node, means for executing the respective operation on each of the set of nodes, each respective operation to be performed on the node by identifying the node using the respective unique label, and means for maintaining each respective unique label on each node individually until the respective operation on the node is successful.

Example 20 includes the apparatus of example 19, wherein the means for communicating includes reading a message from the data plane, the message indicating a status of every one of the nodes.

Example 21 includes the apparatus of example 20, further including means for constructing a respective association policy for each unique label.

Example 22 includes the apparatus of example 21, further including means for releasing the respective unique label and the respective association policy on each node upon successful completion of the respective operation.

Example 23 includes the apparatus of example 19, wherein each operation is a day two operation.

Example 24 includes a method comprising generating a unique label for a node from a data plane, the unique label to identify the node from an environment of nodes, performing an operation on the node, the operation to be performed on the node by identifying the node associated with the unique label, and maintaining the unique label until the operation on the node is successful.

Example 25 includes the method of example 24, further including retrieving a message from the data plane, the message indicating a status of the node.

Example 26 includes the method of example 25, further including constructing an association policy for the unique label.

Example 27 includes the method of example 26, further including communicating the association policy to a server, the server to maintain the association policy.

Example 28 includes the method of example 26, further including releasing the unique label and the association policy from the nodes upon successful completion of the operation.

Example 29 includes the method of example 24, further including re-executing the operation after an unsuccessful completion of the operation.

Example 30 includes the method of example 24, further including retrieving information from more than one node, and generating a respective unique label for each node.

Example 31 includes the method of example 30, further including identifying a respective operation for each node, and performing the respective operation on each node, each respective operation to be performed on each node by identifying the node using the respective unique label.

Example 32 includes the method of example 24, wherein the operation is a day two operation.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   interface circuitry;
   machine readable instructions; and
   processor circuitry to at least one of instantiate or execute the machine readable instructions to:
   generate a unique label for a node from a data plane, the unique label to identify the node, the unique label comprising a dynamic tag associated with operations being performed;
   perform an operation on the node, the operation to be performed on the node by identifying the node associated with the unique label; and
   maintain the unique label until the operation on the node is successful;
   wherein the processor circuitry is to construct an association policy for the unique label; and
   wherein the processor circuitry is to release the unique label and the association policy from the node upon successful completion of the operation.

2. The apparatus of claim 1, further including retrieving a message from the data plane, the message indicating a status of the node.

3. The apparatus of claim 1, wherein the association policy is communicated to a server, the server to maintain the association policy.

4. The apparatus of claim 1, wherein the processor circuitry is to re-execute the operation after an unsuccessful completion of the operation.

5. The apparatus of claim 1, wherein the processor circuitry is to retrieve information from a plurality of nodes, the processor circuitry to generate a respective unique label for each of the plurality of nodes.

6. The apparatus of claim 5, wherein the processor circuitry is to identify a respective operation for each node and perform the respective operation on each of the plurality of nodes, each respective operation to be performed on each of the plurality of nodes by identifying the node using the respective unique label.

7. The apparatus of claim 1, wherein the operation is a day two operation.

8. A non-transitory machine readable storage medium comprising instructions that, when executed, cause processor circuitry to at least:
generate a unique label for a node from a data plane, the unique label to identify the node from an environment of nodes, the unique label comprising a dynamic tag associated with operations being performed;
perform an operation on the node, the operation to be performed on the node by identifying the node associated with the unique label; and
maintain the unique label until the operation on the node is successful;
wherein the processor circuitry is further caused to:
construct an association policy for the unique label; and
release the unique label and the association policy from the node upon successful completion of the operation.

9. The non-transitory machine readable storage medium of claim 8, wherein the instructions, when executed, cause the processor circuitry to retrieve a message from the data plane, the message indicating a status of the node.

10. The non-transitory machine readable storage medium of claim 8, wherein the association policy is communicated to a server, the server to maintain the association policy.

11. The non-transitory machine readable storage medium of claim 8, wherein the instructions, when executed, cause the processor circuitry to re-execute the operation after an unsuccessful completion of the operation.

12. The non-transitory machine readable storage medium of claim 8, wherein the instructions, when executed, cause the processor circuitry to retrieve information from more than one node, the processor circuitry to generate a respective unique label for each node.

13. The non-transitory machine readable storage medium of claim 12, wherein the instructions, when executed, cause the processor circuitry to identify a respective operation for each node and perform the respective operation on each node, each respective operation to be performed on each node by identifying the node using the respective unique label.

14. The non-transitory machine readable storage medium of claim 8, wherein the operation is a day two operation.

15. An apparatus comprising:
circuitry for communicating with a plurality of nodes and a server, the means for communicating to collect information regarding the plurality of nodes from a data plane;
first circuitry for identifying, from the plurality of nodes, a set of nodes to execute an operation on;
second circuitry for identifying a respective operation to be performed on each of the set of nodes;
a label generation circuitry for generating a respective unique label for each of the set of nodes, each respective unique label to identify each individual node, the unique label comprising a dynamic tag associated with operations being performed;
a processor circuitry for executing the respective operation on each of the set of nodes, each respective operation to be performed on the node by identifying the node using the respective unique label; and
a label maintenance circuitry for maintaining each respective unique label on each node individually until the respective operation on the node is successful; and
a policy associator circuitry for constructing a respective association policy for each unique label;
wherein the processor circuitry is further configured for releasing the unique label and the association policy from the node upon successful completion of the operation.

* * * * *